US011253995B2

(12) United States Patent
Odell

(10) Patent No.: US 11,253,995 B2
(45) Date of Patent: Feb. 22, 2022

(54) END EFFECTOR WITH COMPRESSION WEDGE

(71) Applicant: Propack Processing and Packaging Systems, Inc., Beamsville (CA)

(72) Inventor: Clifford Ronald John Odell, Beamsville (CA)

(73) Assignee: Propack Processing and Packaging Systems, Inc.

( * ) Notice: Subject to any disclaimer, the term of this patent is extended or adjusted under 35 U.S.C. 154(b) by 35 days.

(21) Appl. No.: 16/879,602

(22) Filed: May 20, 2020

(65) Prior Publication Data

US 2021/0362325 A1    Nov. 25, 2021

(51) Int. Cl.
*B25J 9/10* (2006.01)
*B65G 47/91* (2006.01)
*B25J 15/06* (2006.01)

(52) U.S. Cl.
CPC .......... *B25J 9/1035* (2013.01); *B25J 9/1005* (2013.01); *B25J 15/0616* (2013.01); *B65G 47/918* (2013.01)

(58) Field of Classification Search
CPC .... B25J 9/1035; B25J 9/1005; B25J 15/0616; B65G 47/918
See application file for complete search history.

(56) References Cited

U.S. PATENT DOCUMENTS

| 6,439,631 | B1 * | 8/2002 | Kress | B65G 47/918 |
| | | | | 294/65 |
| 7,390,040 | B2 | 6/2008 | Subotincic | |
| 7,690,706 | B2 * | 4/2010 | Wild | B65G 47/918 |
| | | | | 294/65 |
| 7,954,869 | B2 * | 6/2011 | Shim | H01L 21/68707 |
| | | | | 294/65 |
| 8,534,727 | B2 * | 9/2013 | Weclawski | B65G 47/918 |
| | | | | 294/65 |
| 9,073,222 | B2 | 7/2015 | Crosby | |
| 10,343,290 | B2 * | 7/2019 | Claretti | B25J 15/00 |
| 10,843,347 | B1 * | 11/2020 | Murphy | B25J 15/0666 |

* cited by examiner

*Primary Examiner* — Stephen A Vu
(74) *Attorney, Agent, or Firm* — Vista IP Law Group LLP

(57) ABSTRACT

An end effector for use in the packaging industry has compression wedges that bookend subgroups of carrier assemblies on the end effector. The compression wedges are attached to the frame of the end effector via wedge blocks, which may be fixed to the frame or slidingly engaged with the frame.

20 Claims, 14 Drawing Sheets

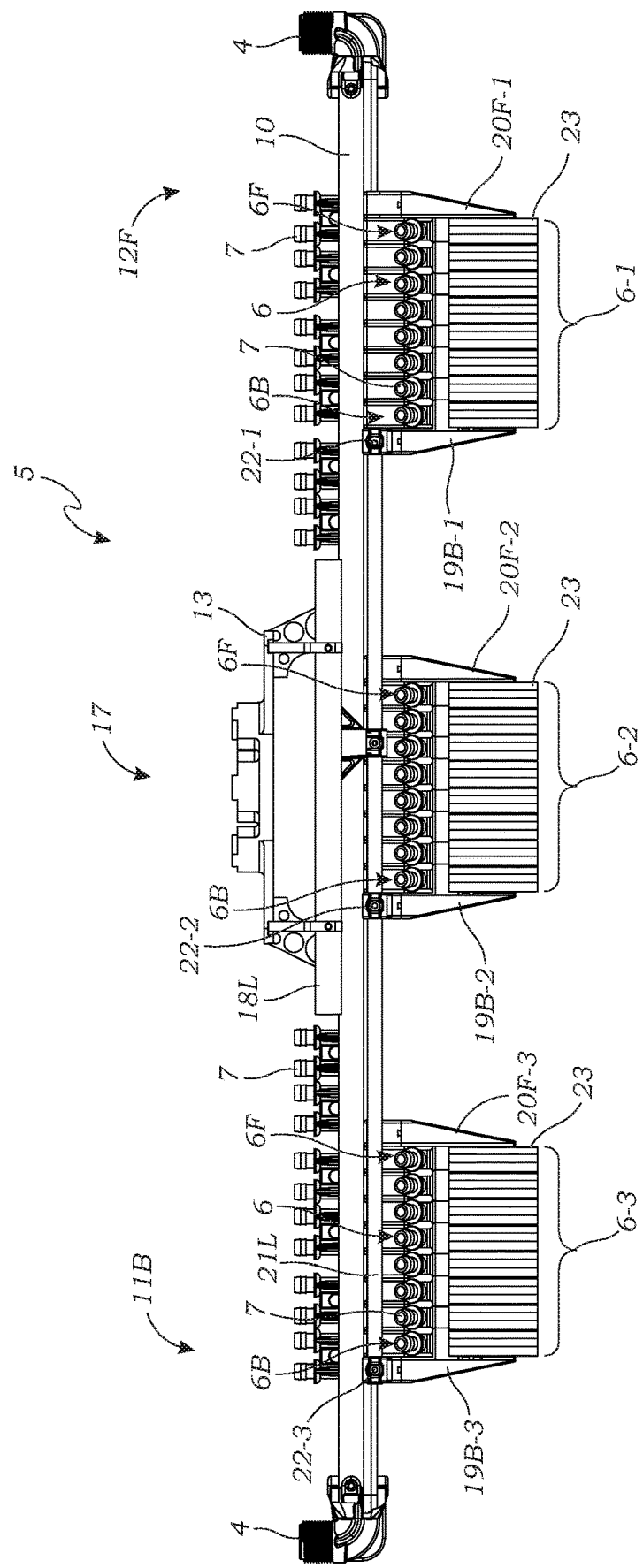

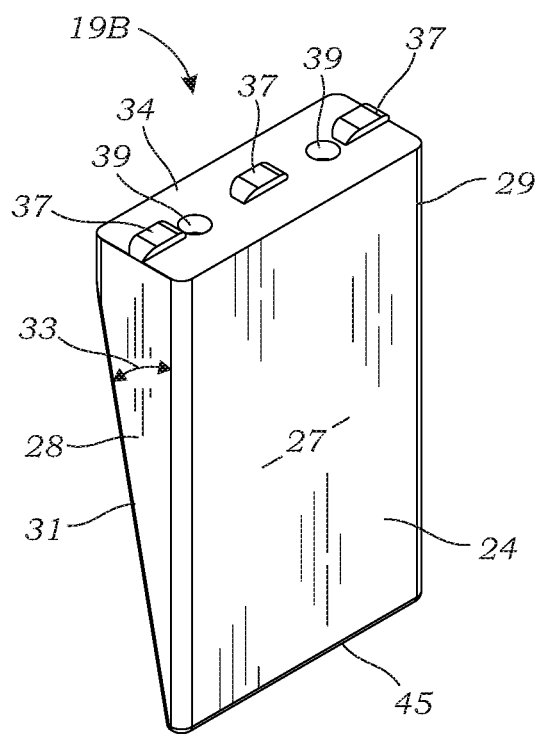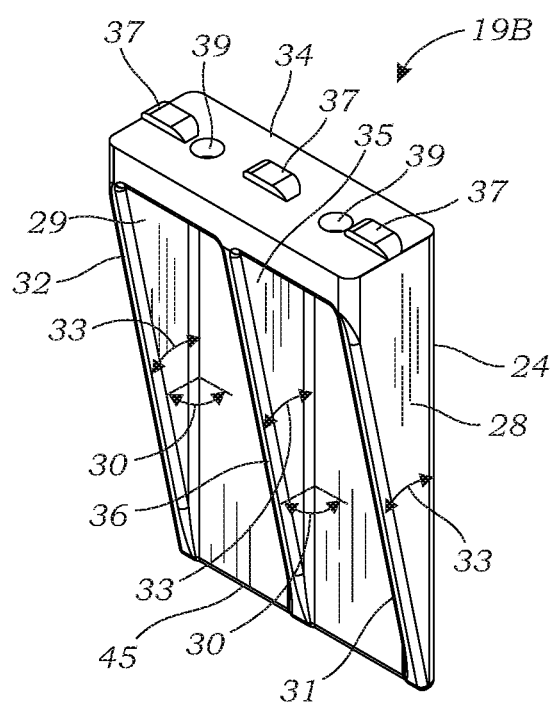
Fig. 10A         Fig. 10B
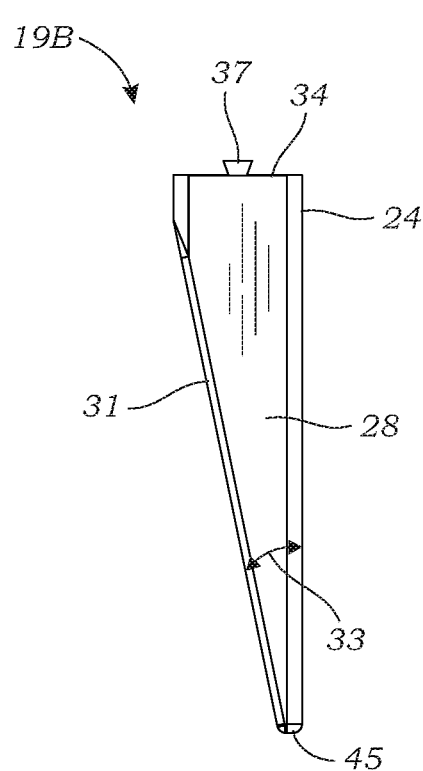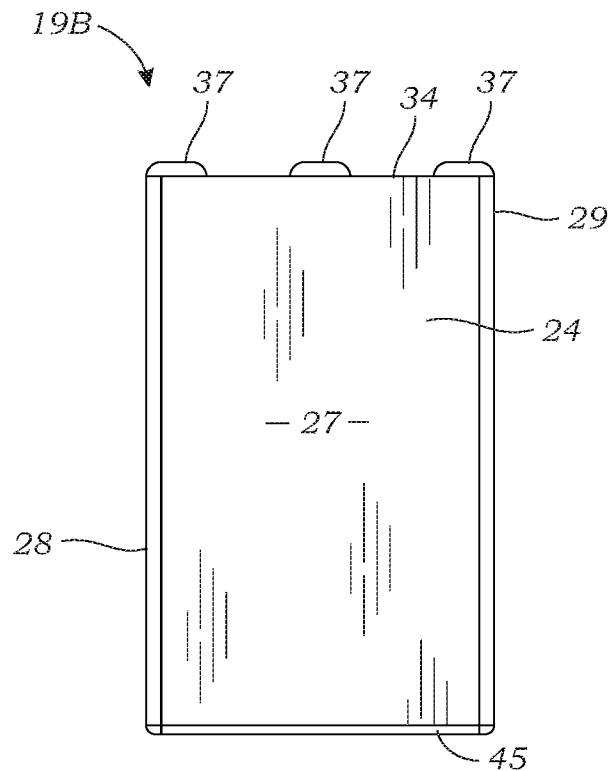
Fig. 10C         Fig. 10D

END EFFECTOR WITH COMPRESSION WEDGE

CROSS-REFERENCE TO RELATED APPLICATIONS

This application is related to U.S. patent application Ser. No. 14/536,653 filed Nov. 9, 2014, which issued Jul. 7, 2015 as U.S. Pat. No. 9,073,222 ("the '222 patent"), as well as the continuation applications filed therefrom, namely: U.S. patent application Ser. No. 14/741,312 filed Jun. 16, 2015, which issued Mar. 29, 2016 as U.S. Pat. No. 9,296,112; U.S. patent application Ser. No. 15/058,066 filed Mar. 1, 2016, which issued Aug. 15, 2017 as U.S. Pat. No. 9,731,913; U.S. patent application Ser. No. 15/642,230 filed Jul. 5, 2017, which issued Nov. 7, 2017 as U.S. Pat. No. 9,809,398; and U.S. patent application Ser. No. 15/803,714 filed Nov. 3, 2017, which issued Jun. 18, 2019 as U.S. Pat. No. 10,322,888. No priority is claimed.

FIELD OF THE INVENTION

The field of the invention relates generally to end effectors for picking and placing objects, typically used with robotic arms for picking up items off a conveyor belt and placing them in bulk packaging.

BACKGROUND

End effectors, also known as end-of-arm tools, in general are well-known in the art. In the packaging industry, an end effector is typically attached to the end of a robotic arm from a robot such as a Delta robot. The robot controls the robotic arm, which in turn controls movement of the end effector. The robot further includes a rotatable shaft (also sometimes referred to as a rotary axis or a fourth axis) controlled by a servo to actuate an actuation mechanism of the end effector, to control movement of individual carrier assemblies. This is done typically to retrieve (pick) items (e.g., candy or protein bars, potato chip bags, or other food items) from a first conveyor belt, and deliver (place) them into containers such as boxes on a second conveyor belt for retail distribution. Such a process is thus often referred to as "pick and place."

A typical end effector has carrier assemblies that each include a carrier block either fixed to the frame of the end effector, or slidingly engaged to the frame, with one or more carriers (also referred to as pick-up members) attached thereto and operatively connected to a vacuum source through vacuum ports to enable picking up items during the "pick" operation. Typical pick-up members are suction cups. The quantity and arrangement of the pick-up members may vary depending on the application.

Typically, a first set of parameters associated with the items on the first conveyor belt are determined, such as their shape, dimensions, configuration, orientation, distance between each item, and distance between each group of items, and the first conveyor belt moves at a known speed. These parameters may be preset, programmed, and/or adjusted as needed. Likewise, the packages, boxes, or cartons that receive the items are on a second conveyor belt, with a known second set of parameters that may differ from the first set of parameters. The end effectors are typically custom-designed and the robot programmed to accommodate the parameters for specific applications. In this manner, the robot and end effector may be programmed and designed to pick up items at a first diverged pitch (e.g., 1 row of 24 items) and place them into packaging at a second converged pitch (e.g., 3 groups of 8 each).

For the pick-up members to pick up items at a first pitch, and place them into a carton at a second pitch, some or all of the carrier assemblies must be moveable. During a typical pick-and-place cycle, the carrier assemblies are moved from a diverged pitch (pick) to a converged pitch (place) while the robotic arm is moving the end effector from the pick location to the place location. For a more detailed description of such end effectors and their operation, see the '222 patent, the contents of which are hereby incorporated herein by reference.

Both the rotary axis and the carrier blocks typically move at high speeds during the cycle, causing various forces to act on the items being picked up. In some instances, the items may still be moving during the place operation, causing slight misalignment that hinders or prevents proper placement. For example, in a tight-fitting packaging application with little or no leeway for extra space, if the items being placed are swaying even slightly, an outside item might contact the top edge of a carton wall during the place operation, damaging the item and/or the carton wall. When the items being packaged are bars (candy, protein, granola, etc.) the swaying is referred to as "bar-swing." There is thus a need for an improvement to existing end-effector technology that addresses bar-swing.

SUMMARY

Carrier assemblies are referred to generally herein using reference number 6. Groups of carrier assemblies on the same end effector that will be converged together during the place operation are referred to herein using reference numbers 6-1, 6-2, 6-3, . . . 6-n. For carrier assemblies arranged linearly on the frame of an end effector, group 6-1 refers to the group closest to the front end of the frame, group 6-2 refers to the next group, and so on. The back most carrier assembly in a group is referred to herein as 6B, and the front most carrier assembly in a group is referred to herein as 6F.

In one embodiment, the present invention is directed to an end effector comprising a frame, a rack and pinion assembly, one or more drive rods, one or more groups of carrier assemblies, and compression wedges (attached to the frame via wedge blocks) bookending corresponding groups of the carrier assemblies.

In some embodiments, the wedge blocks for both compression wedges bookending a group of carrier assemblies are slidingly engaged with the frame. In other embodiments, one of the wedge blocks is fixed to the frame. Some embodiments include only a single group of carrier assemblies, and a single pair of compression wedges bookending the group of carrier assemblies. Some embodiments have two groups of carrier assemblies, and two corresponding pairs of compression wedges to bookend the two groups of carrier assemblies. Some embodiments have three groups of carrier assemblies, and three corresponding pairs of compression wedges to bookend the three groups of carrier assemblies.

The rack and pinion assembly is operatively connected to a rotary axis and to the drive rods. The drive rods are securely connected to the wedge blocks as described herein. Thus, as the rotary axis rotates, the rack and pinion assembly is actuated, which in turn actuates the drive rods, which causes the wedge blocks connected to the drive rods to move the wedges longitudinally along the frame, compressing carrier members of a group together as described herein.

In one embodiment, the carrier assemblies in a group are linked by arms having grabbers/fingers. During divergence, a grabber/finger on one carrier assembly engages the grabber/finger of an adjacent carrier assembly and pulls the adjacent carrier assembly in the direction of movement of the first carrier assembly. During convergence, the grabbers/fingers disengage and glide along the surface of their adjacent arms and/or through slots in the openings of the adjacent carrier blocks until full convergence is achieved. For a more detailed description of this, see the '222 patent. With the addition of compression wedges as described herein, at full convergence a group of carrier assemblies are compressed together by the compression wedges bookending the group.

BRIEF DESCRIPTION OF THE DRAWINGS

FIG. 4B is a left side elevation view of the end effector of FIG. 4A;

FIG. 10A is a front top left perspective view of a compression wedge in accordance with an embodiment of the present invention;

FIG. 10B is a back top left perspective view of the compression wedge of FIG. 10A;

FIG. 10C is a left side elevation view of the compression wedge of FIG. 10A; and FIG. 10D is a front elevation view of the compression wedge of FIG. 10A.

DETAILED DESCRIPTION

The invention relates generally to end effectors for picking and placing objects, typically used with robotic arms for picking up items off a conveyor belt and placing them in bulk packaging. To address the issue of bar-swing, compression wedges are used to squeeze/compress groups of carrier assemblies into tighter configurations prior to and/or during the place operation, as explained herein.

Figure 1A:
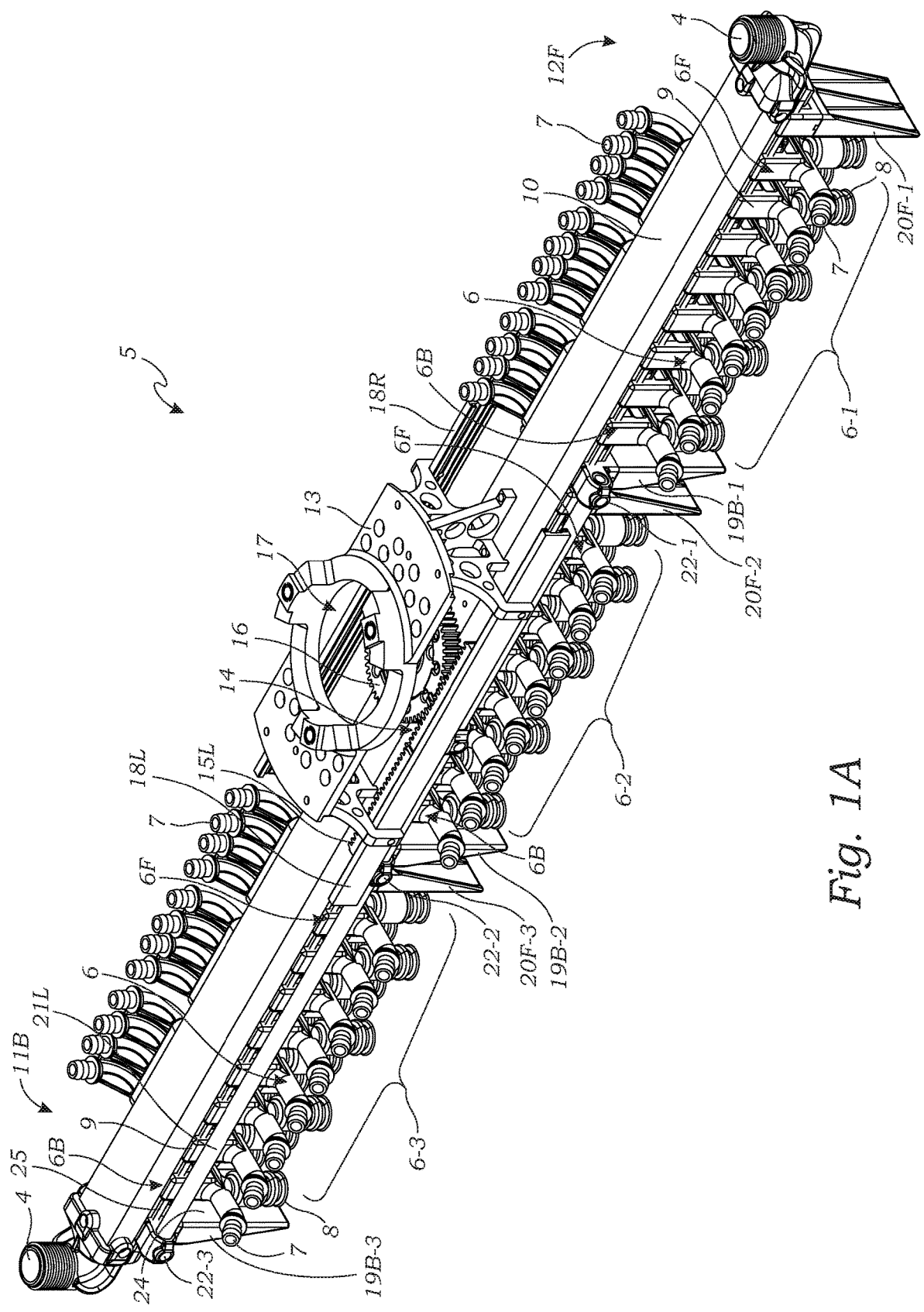
FIG. 1A is a left side perspective view of an end effector according to one embodiment of the present invention, with the carrier assemblies in a diverged (pick) position.
Figure 1B:
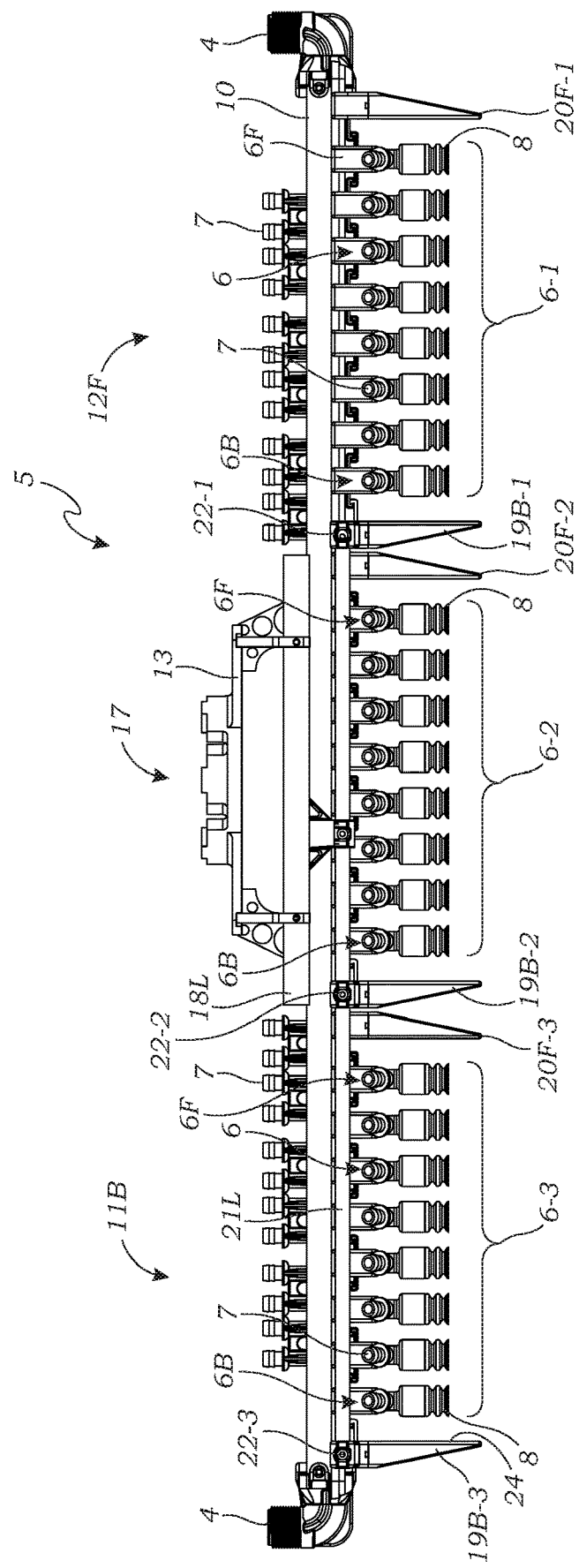
FIG. 1B is a left side elevation view of the end effector of FIG. 1A.

Referring to FIG. 1A, a left side perspective view of an end effector 5 in accordance with the present invention is shown, with carrier assemblies 6 in a diverged (pick) position. The right side is functionally symmetric to the left side. FIG. 1B shows a left side elevation view of the end effector 5 of FIG. 1A, with the carrier assemblies 6 in the same diverged (pick) position. The carrier assemblies 6 on this end effector 5 are configured into three groups (6-1, 6-2, and 6-3) of eight carrier assemblies 6 each. Group 6-1 is the front group, group 6-2 is the middle group, and group 6-3 is the back group.

The end effector 5 in accordance with the present invention may have one, two, three, four, five, six, seven, eight, nine, ten, or more groups of carrier assemblies 6. A carrier assembly 6 has a carrier block 9 and one or more carriers 8 (in this embodiment, suction cups). The carriers 8 in this embodiment are fixedly attached to their corresponding carrier blocks 9. In some embodiments, the carriers 8 are removably attached to their corresponding carrier blocks 9 for simple replacement and repair, but are fixedly attached during operation. In such embodiments, for example, a carrier 8 may be attached to a carrier block 9 via a dovetail 37 and groove 38 configuration, and operationally secured using M4 screws or the like. In either case, the carrier assemblies are referred to herein as being securely attached, because they are fixedly attached during operation.

Distribution vacuum ports 7 attached to the carrier blocks 9 are associated with pick-up members 8 attached to the corresponding carrier blocks 9, and are operatively connected to input vacuum ports 4 which in turn are connected to a vacuum source (not shown), as explained in more detail in the '222 patent. Each carrier assembly 6 in the embodiment of FIGS. 1A-1B has left and right pick-up members 8, but only the left pick-up members 8 are fully visible. Each pick-up member 8 has a corresponding vacuum port 7. In some embodiments, each carrier block 9 may support only a single pick-up member 8.

The frame 10 has a back end 11B and a front end 12F. A bridge 13 protects a rack and pinion assembly 14, which includes a right side rack (not seen), a left side rack 15L, and a pinion 16. The bridge 13 also provides support and has an opening 17 for the rotary axis (not shown) to engage the pinion 16 for actuating the carrier assemblies 6 and compression wedges 19B (back) and 20F (front) as applicable. The left side rack 15L in this embodiment is guided by a corresponding rail 18L. The right side rack (not shown) is likewise guided by a corresponding rail 18R.

Each group 6-1, 6-2, and 6-3 of carrier assemblies 6 is bookended by a corresponding pair of compression wedges 19B (back) and 20F (front). The pairs of wedges are labeled 19B-1 and 20E-1, 19B-2 and 20E-2, and 19B-3 and 20E-3, corresponding to the carrier groups 6-1, 6-2, and 6-3 which they bookend respectively. Left drive rod 21L is securely attached at points 22-1, 22-2, and 22-3 to wedge blocks 25 which support back compression wedges 19B-1, 19B-2, and 19B-3 respectively. The wedge blocks 25 are configured to securely receive the back compression wedges 19B-1, 19B-2, and 19B-3 respectively, as described in more detail with respect to FIG. 5 and FIGS. 10A-10D. Right drive rod (not seen) is likewise securely attached to wedge blocks 25 which support front compression wedges 20E-1, 20E-2, and 20E-3.

Figure 2A:
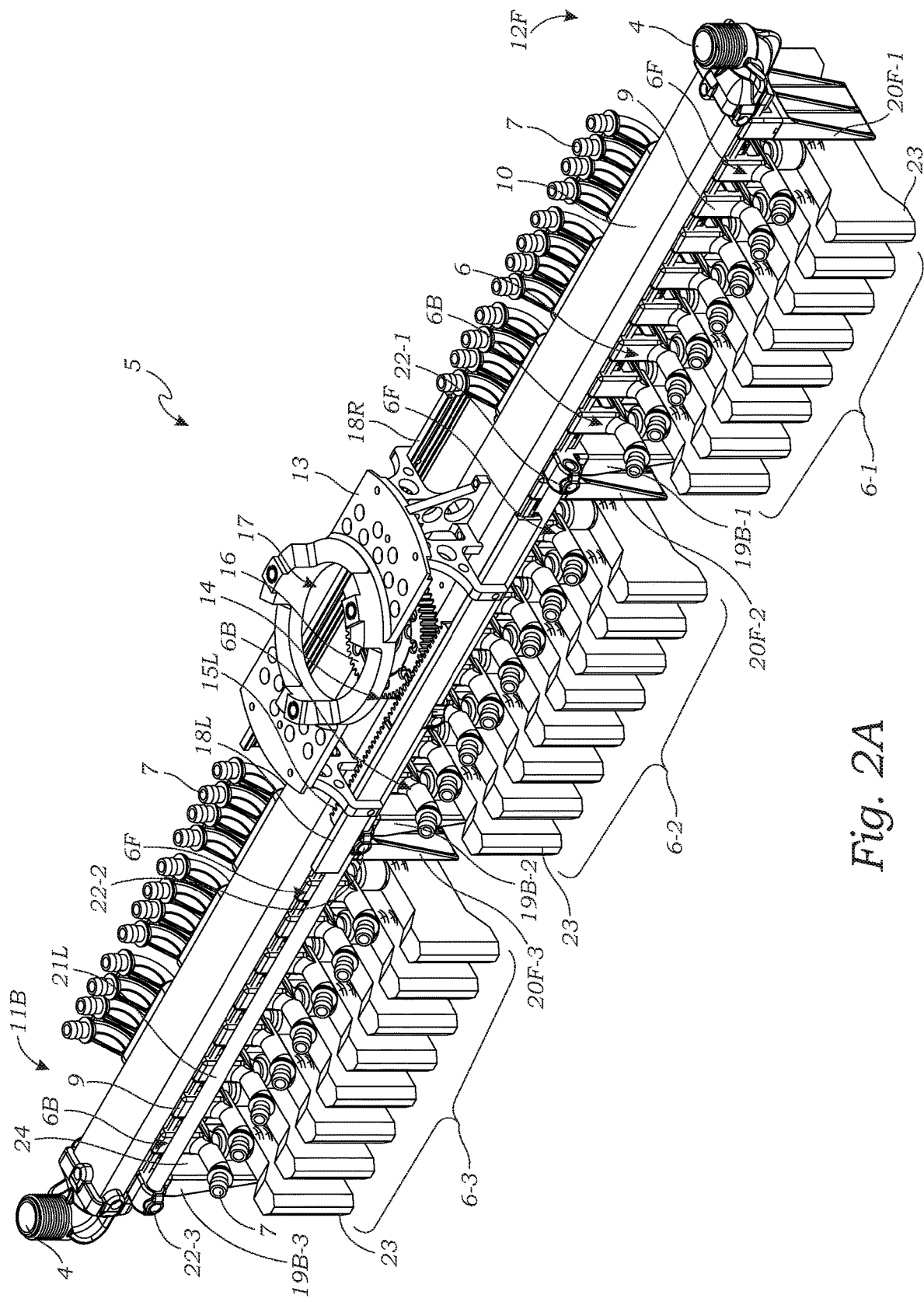
FIG. 2A is a left side perspective view of the end effector of FIG. 1A, with the carrier assemblies holding products (e.g., protein bars) in the diverged (pick) position.
Figure 2B:
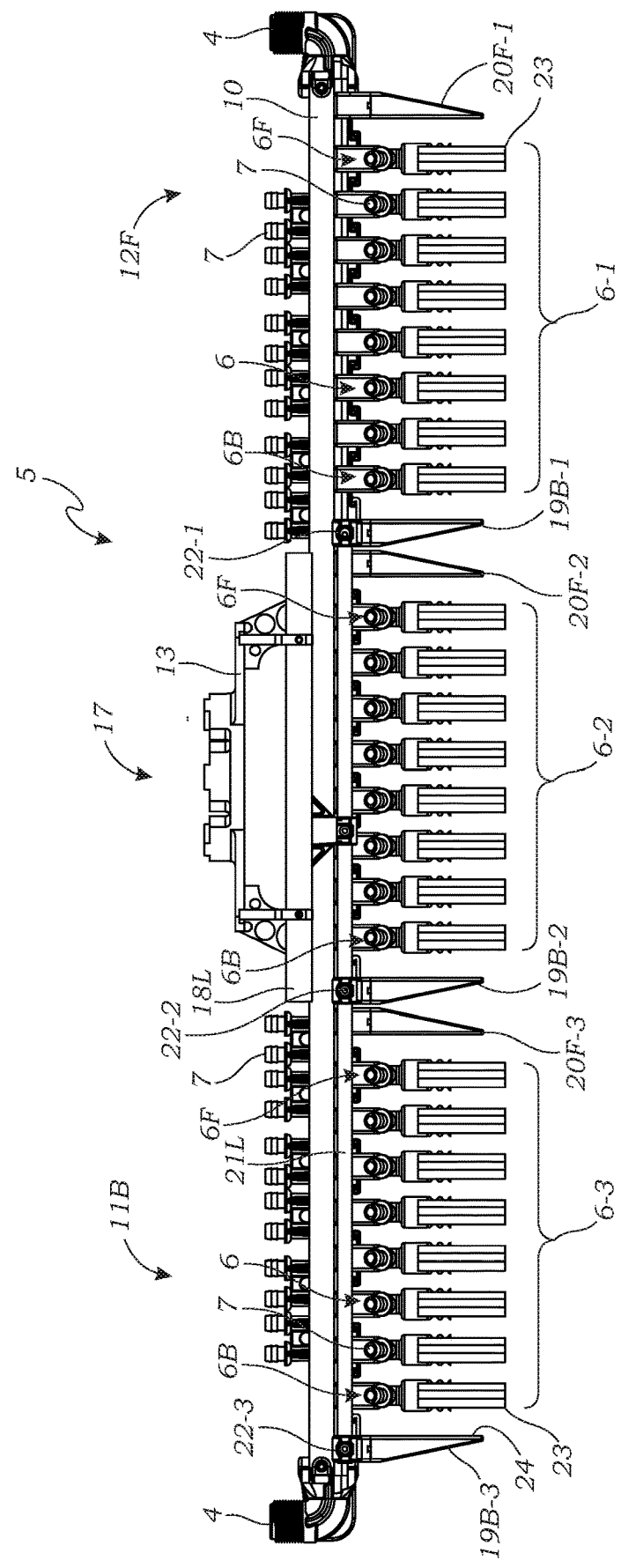
FIG. 2B is a left side elevation view of the end effector of FIG. 2A.

FIG. 2A shows a left side perspective view of the end effector of FIG. 1A holding products 23 (e.g., protein bars) with the carrier assemblies 6 in the same diverged (pick) position. FIG. 2B shows a left side elevation view of the end effector 5 of FIG. 2A holding products 23 with the carrier assemblies 6 in the same diverged (pick) position.

Figure 3A:
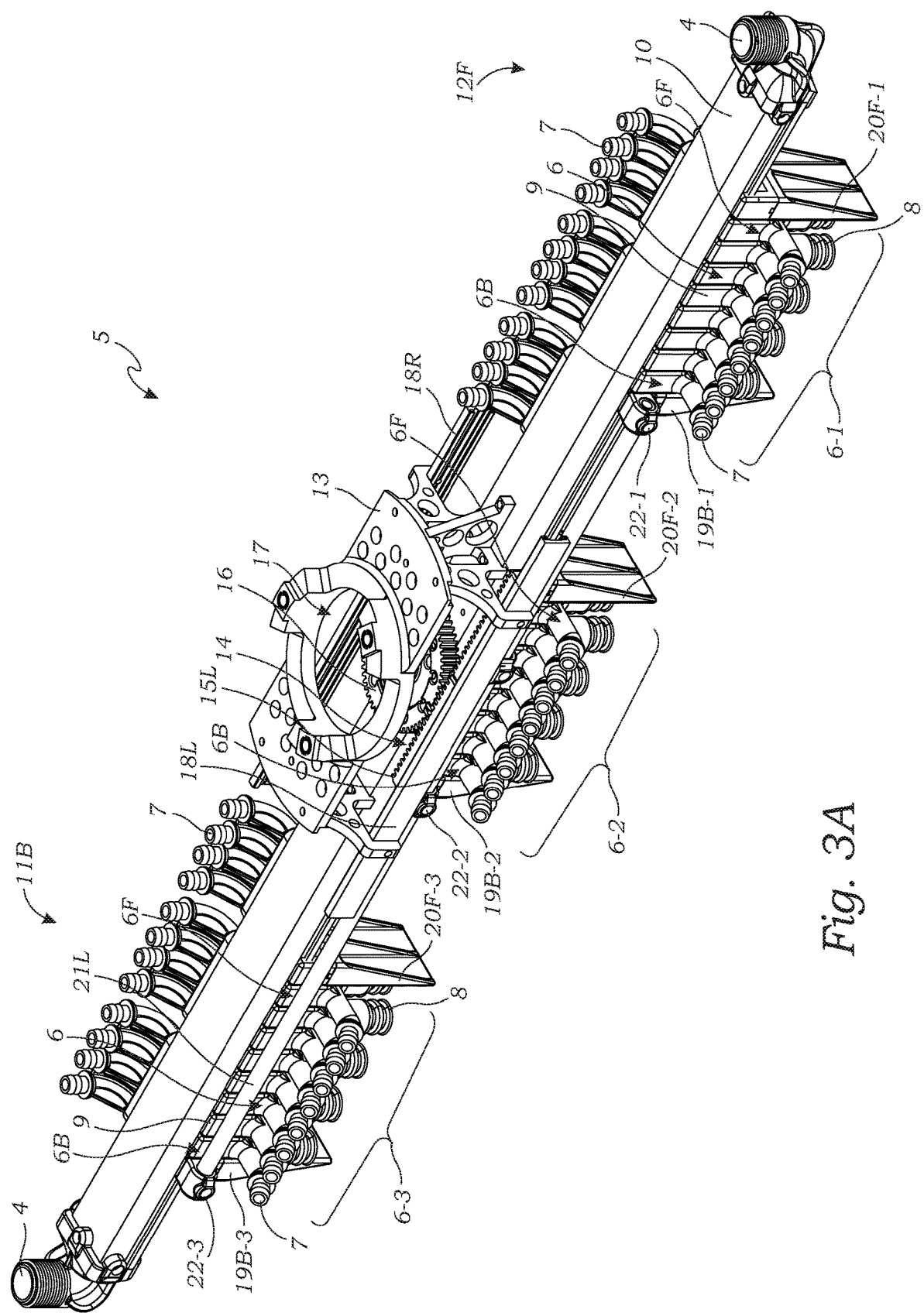
FIG. 3A is a left side perspective view of an end effector according to an embodiment of the present invention, with the carrier assemblies in a converged (place) position.
Figure 3B:
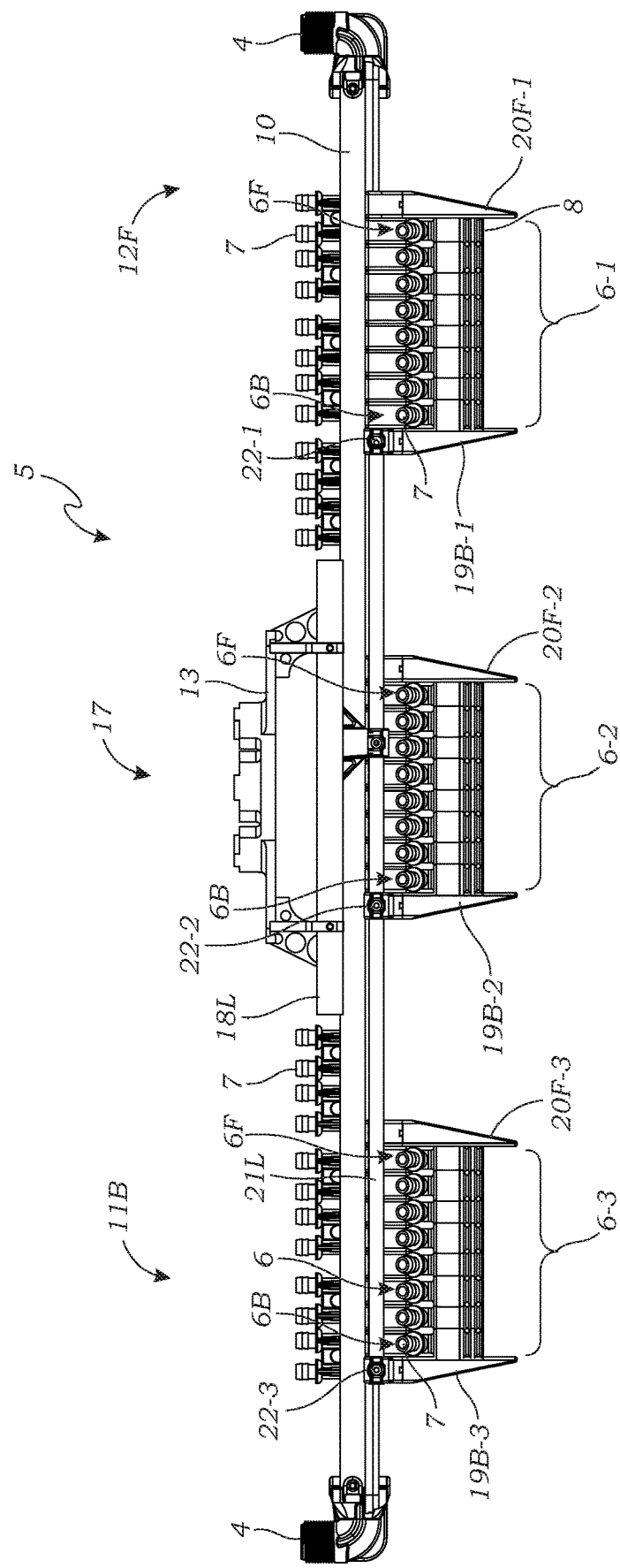
FIG. 3B is a left side elevation view of the end effector of FIG. 3A.
Figure 4A:
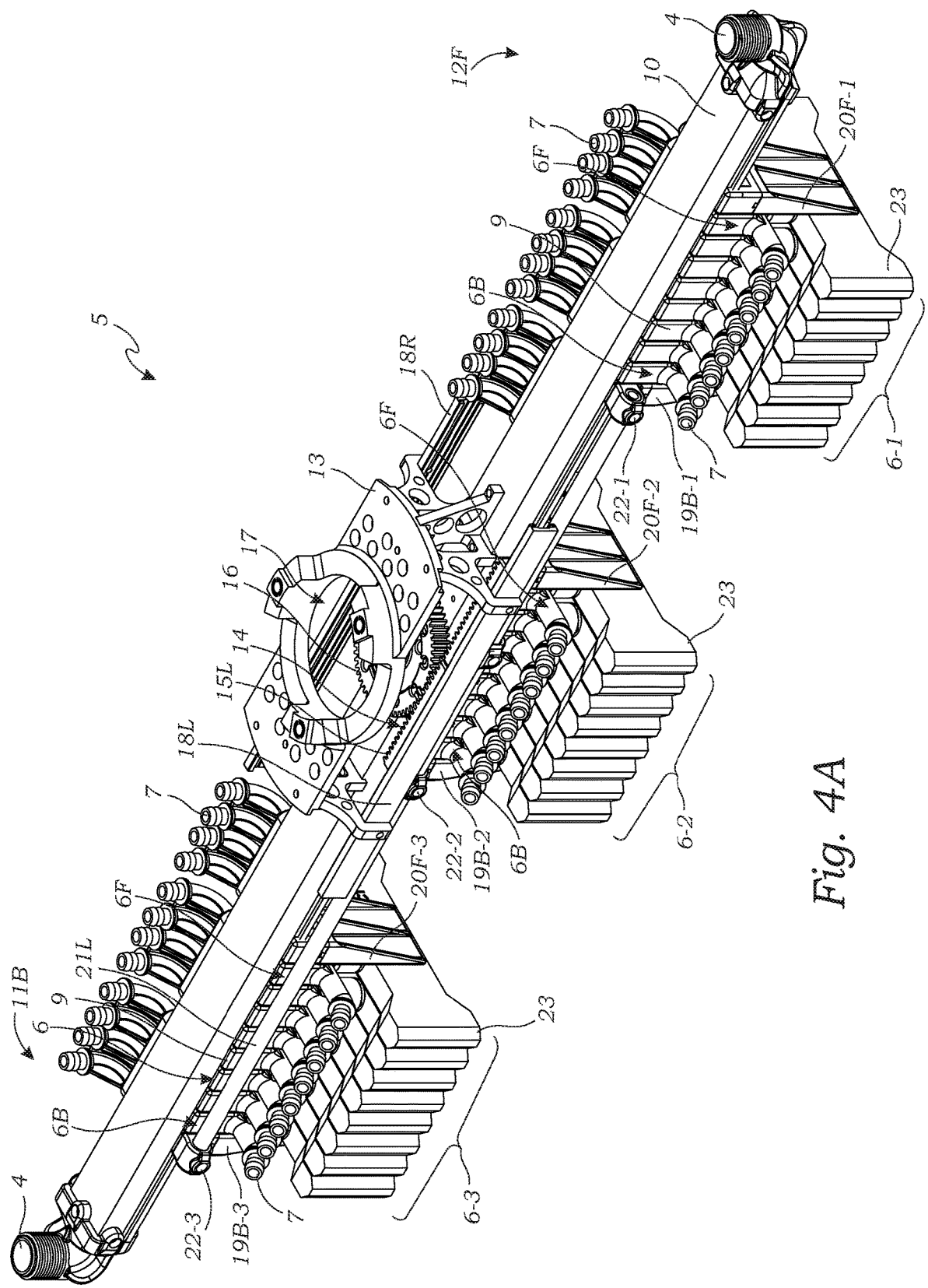
FIG. 4A is a left side perspective view the end effector of FIG. 3A with the carrier assemblies holding products (e.g., protein bars) in the converged (place) position.

Turning now to FIG. 3A, a left side perspective view of an end effector 5 according to an embodiment of the present invention is shown, with the carrier assemblies 6 in a converged (place) position. FIG. 3B shows a left side elevation view of the end effector 5 of FIG. 3A, with the carrier assemblies 6 in the same converged (place) position. FIG. 4A shows a left side perspective view the end effector 5 of FIG. 3A, with the carrier assemblies 6 in the converged (place) position and holding products 23. FIG. 4B shows a left side elevation view of the end effector 5 of FIG. 4A holding products 23 with the carrier assemblies 6 in the same converged (place) position.

Referring still to FIGS. 1A-4B, the invention will now be described in more detail. As previously stated, although FIGS. 1A-4B are from a view of the left side of the frame 10, the right side of the frame 10 in this embodiment has pick-up members 8 arranged similarly. Each carrier assembly 6 has a left and right pick-up member 8. As such, when a particular carrier assembly 6 moves linearly along the frame 10, the left and right pick-up members 8 attached to the carrier blocks 9 of the carrier assembly 6 both move in synch with the carrier assembly 6 and with each other. This embodiment also has a rack and pinion assembly 14, as described in more detail in the '222 patent. In general, the rack and pinion assembly 14 includes a right side rack (not shown), a right side rack rail 18R, a left side rack 15L, a left side rack rail 18L, and a pinion 16. The right side rack (not shown) and left side rack 15L are each slidingly engaged with the right and left sides of the frame 10 respectively, and configured for linear sliding movement along the right and left sides of the frame 10 respectively. The pinion 16 is rotatably engaged between the right side rack (not shown) and the left side rack 15L.

The carrier assemblies 6 are arranged in groups. In this example, there are three groups (6-1, 6-2, and 6-3) of eight carrier assemblies 6 each. Group 6-1 is closest to the front end 12F of the frame, group 6-2 is behind group 6-1, and group 6-3 is behind group 6-2 closest to the back end 11B of the frame 10. Group 6-1 is bookended by back compression wedge 19B-1 in the back and front compression wedge 20E-1 in the front. Group 6-2 is bookended by back compression wedge 19B-2 in the back and front compression wedge 20E-2 in the front. Group 6-3 is bookended by back compression wedge 19B-3 in the back and front compression wedge 20E-3 in the front. The carrier blocks 9 have grooves 26 (see FIG. 5) for sliding engagement with the frame 10 and linear sliding movement along the frame 10. The wedge blocks 25 likewise have grooves 26 (see FIG. 5). For wedge blocks 25 not fixed to the frame 10, these grooves 26 are slidingly engaged with the frame 10 and facilitate linear sliding movement of the wedge blocks 25 along the frame 10.

The invention will be described first with respect to just group 6-1, which is the group closest to the front end 12F of the frame 10. The description is applicable to each group of carrier assemblies 6.

In group 6-1, the carrier assemblies 6 are slidingly engaged with the frame 10 via the carrier blocks 9, and are configured for linear sliding movement along the frame 10, as discussed in more detail, for example, in the '222 patent. The carrier assemblies 6 are arranged linearly along the frame 10 from a back carrier assembly 6B to a front carrier assembly 6F. There may be any number of carrier assemblies 6 (including none) between the back carrier assembly 6B and the front carrier assembly 6F within a group. The back compression wedge 19B-1 is positioned linearly before (in back of) the back carrier assembly 6B of group 6-1 and thus provides a back bookend to group 6-1, and is securely attached to a wedge block 25 configured to receive the back compression wedge 19B-1. Wedge block 25 is slidingly engaged with the frame 10 and configured for linear sliding movement along the frame 10. A front compression wedge 20E-1 is positioned linearly after (in front of) the front carrier assembly 6F of group 6-1 and thus provides a front bookend to group 6-1. The front compression wedge 20E-1 is securely attached to a wedge block 25 configured to receive the front compression wedge 20E-1, which is engaged with the frame 10 by being either securely attached to the frame 10, or configured for linear sliding movement along the frame 10, depending on the application.

The wedge block 25 supporting back compression wedge 19B-1 is securely attached to a left drive rod 21L at location 22-1. The left drive rod 21L is in turn securely attached to the left side rack 15L, such that when group 6-1 is in a diverged position as seen in FIG. 1A and the pinion 16 is rotated within the right side rack (not shown) and the left side rack 15L by a rotary axis, the left drive rod 21L moves linearly with the left side rack 15L to drive the back compression wedge 19B-1 linearly towards the front compression wedge 20E-1. In this manner, when the left drive rod 21L drives the back compression wedge 19B-1 linearly towards the front compression wedge 20E-1, the carrier assemblies 6 of group 6-1 are compressed together into a converged position bookended by the back compression wedge 19B-1 and the front compression wedge 20E-1, as seen in FIGS. 3A, 3B, 4A, and 4B.

In some embodiments, the wedge block 25 supporting the front compression wedge 20F for a group of carrier assemblies 6 is securely attached to the frame 10, and only the wedge block 25 for the corresponding back compression wedge 19B is configured for linear sliding movement along the frame 10 (or vice versa). In the embodiment shown in FIG. 1A, the wedge blocks 25 for the back compression wedges 19B-1, 19B-2, and 19B-3 and the front compression wedges 20E-1, 20E-2, and 20E-3 are all slidingly engaged with the frame 10 and configured for linear sliding movement along the frame 10. The wedge blocks 25 supporting the back compression wedges 19B-1, 19B-2 and 19B-3 are securely attached to the left drive rod 21L at locations 22-1, 22-2 and 22-3 respectively.

Referring now to group 6-2, the back compression wedge 19B-2 is positioned linearly before the back carrier assembly 6B of group 6-2. The front compression wedge 20E-2 is positioned linearly after the front carrier assembly 6F of group 6-2 and before the back compression wedge 19B-1. So when group 6-2 is in a diverged position as seen in FIG. 1A and the pinion 16 is rotated within the right side rack (not shown) and the left side rack 15L by a rotary axis, the left drive rod 21L moves linearly with the left side rack 15L to drive the back compression wedge 19B-2 linearly towards the front compression wedge 20E-2. In this manner, when the left drive rod 21L drives the back compression wedge 19B-2 linearly towards the front compression wedge 20E-2, the carrier assemblies 6 of group 6-2 are compressed together into a converged position bookended by the back compression wedge 19B-2 and the front compression wedge 20E-2, as seen in FIGS. 3A, 3B, 4A, and 4B.

For group 6-3, the back compression wedge 19B-3 is positioned linearly before the back carrier assembly 6B in group 6-3. The front compression wedge 20E-3 is positioned linearly after the front carrier assembly 6F in group 6-3 and before the back compression wedge 19B-2. So likewise when the left drive rod 21L drives the back compression wedge 19B-3 linearly towards the front compression wedge 20E-3, the carrier assemblies 6 of group 6-3 are compressed together into a converged position bookended by the back compression wedge 19B-3 and the front compression wedge 20E-3, as seen in FIGS. 3A, 3B, 4A, and 4B.

The wedge blocks 25 supporting the front compression wedges 20E-1, 20E-2, and 20E-3 are all securely attached to a right drive rod (not shown) similar to how the wedge blocks 25 supporting the back compression wedges 19B-1, 19B-2, and 19B-3 are securely attached to the left drive rod 21L. The right drive rod (not shown) is securely attached to the right side rack (not shown) similar to how the left drive rod 21L is securely attached to the left side rack 15L. So when group 6-1 is in the diverged position as seen in FIG. 1A and the pinion 16 is rotated within the right side rack (not shown) and the left side rack 15L by a rotary axis, the right drive rod (not shown) moves linearly with the right side rack (not shown) to drive the front compression wedge 20E-1 linearly towards the back compression wedge 19B-1. In this manner, when the right drive rod (not shown) drives the front compression wedge 20E-1 linearly towards the back compression wedge 19B-1, the carrier assemblies 6 of group 6-1 are compressed together into a converged position bookended by the back compression wedge 19B-1 and the front compression wedge 20E-1, as seen in FIGS. 3A, 3B, 4A, and 4B.

Likewise when group 6-2 is in the diverged position as seen in FIG. 1A and the pinion 16 is rotated within the right side rack (not shown) and the left side rack 15L by a rotary axis, the right drive rod (not shown) moves linearly with the right side rack (not shown) to drive the front compression wedge 20E-2 linearly towards the back compression wedge 19B-2, so the carrier assemblies 6 of group 6-2 are compressed together into a converged position bookended by the back compression wedge 19B-2 and the front compression wedge 20E-2, as seen in FIGS. 3A, 3B, 4A, and 4B.

Same for group 6-3. That is, when group 6-3 is in the diverged position as seen in FIG. 1A and the pinion 16 is rotated within the right side rack (not shown) and the left side rack 15L by a rotary axis, the right drive rod (not shown) moves linearly with the right side rack (not shown) to drive the front compression wedge 20E-3 linearly towards the back compression wedge 19B-3, so the carrier assemblies 6 of group 6-3 are compressed together into a converged position bookended by the back compression wedge 19B-3 and the front compression wedge 20E-3, as seen in FIGS. 3A, 3B, 4A, and 4B.

Turning now to FIGS. 10A-10D, one embodiment of a compression wedge (19B or 20F) for use with an end effector as described herein will be described. For reference purposes, the wedge will be labeled a back compression wedge 19B, and will be described accordingly. However, the description applies analogously to a front compression wedge 20F.

The wedge 19B has a front wall 24 with a front surface 27 configured to contact a back carrier assembly 6B to slide the back carrier assembly 6B linearly along the frame 10 when the wedge block 25 supporting the compression wedge 19B is slid linearly along the frame 10 by the left drive rod 21L. The front surface 27 may be substantially flat to maximize contact with the carrier assembly 6B and with any product 23 being carried by the carrier assembly 6B. The front surface 27 may have grooves, a sandpaper texture, raised ridges, etc., and still be considered substantially flat, so long as the overall profile appears planar. The front surface 27 may also have protrusions, bumpers, or other surface treatment to help prevent bar-swing if applicable.

A right wall 29 extends back at a right angle 30 from the front wall 24, and a back edge 32 of the right wall 29 forms an acute angle 33 with the vertical edge of the front wall 24 at the bottom 45 of the front wall 24. The acute angle 33 may be any angle from about two degrees to about forty-five degrees depending on the application, but generally the acute angle 33 will be between about five degrees and about thirty degrees, or between about five degrees and about twenty degrees, or between about five degrees and about fifteen degrees. A left wall 28 extends back similarly at a right angle (not shown) from the front wall 24, and a back edge 31 of the left wall 28 is parallel to the back edge 32 of the right wall 29, thus also forming the same acute angle 33. A middle wall 35 likewise extends back at a right angle 30 from the front wall 24 between the right wall 29 and the left wall 28, and a back edge 36 of the middle wall 35 is parallel to the back edges 32 and 31 of the right wall 29 and left wall 28 respectively, thus also forming the same acute angle 33. The walls 28, 29, and 35 provide extra stability to the wedge 19B during operation, and are connected to the front wall 24 by a top 34 configured for secured attachment to the wedge block 25.

The compression wedge 19B may be fixedly secured to the wedge block 34, and may even be integral with the wedge block 24. However, in this embodiment the compression wedge 19B is configured to be securely attached to the wedge block 24. Specifically, the top surface of the top 34 of the compression wedge 19B has one or more dovetail ridges or tabs 37 aligned and configured for mating with a dovetail groove 38 along a bottom surface of the wedge block 25. Alternatively or in addition, the top 34 of the compression wedge 19B may have at least one hole 39 positioned for alignment with a corresponding at least one hole (not shown) in a bottom surface of the wedge block 25, configured so the compression wedge 19B may be securely attached to the wedge block 25 by at least one corresponding screw (not shown) or the like. If the compression wedge 19B is securely attached to the wedge block 25 with both the dovetail mating (37, 38) and the screws (not shown), the wedge 19B may be removed by unscrewing the screws then sliding out of the groove 38 for repair, replacement, etc.

Figure 5:
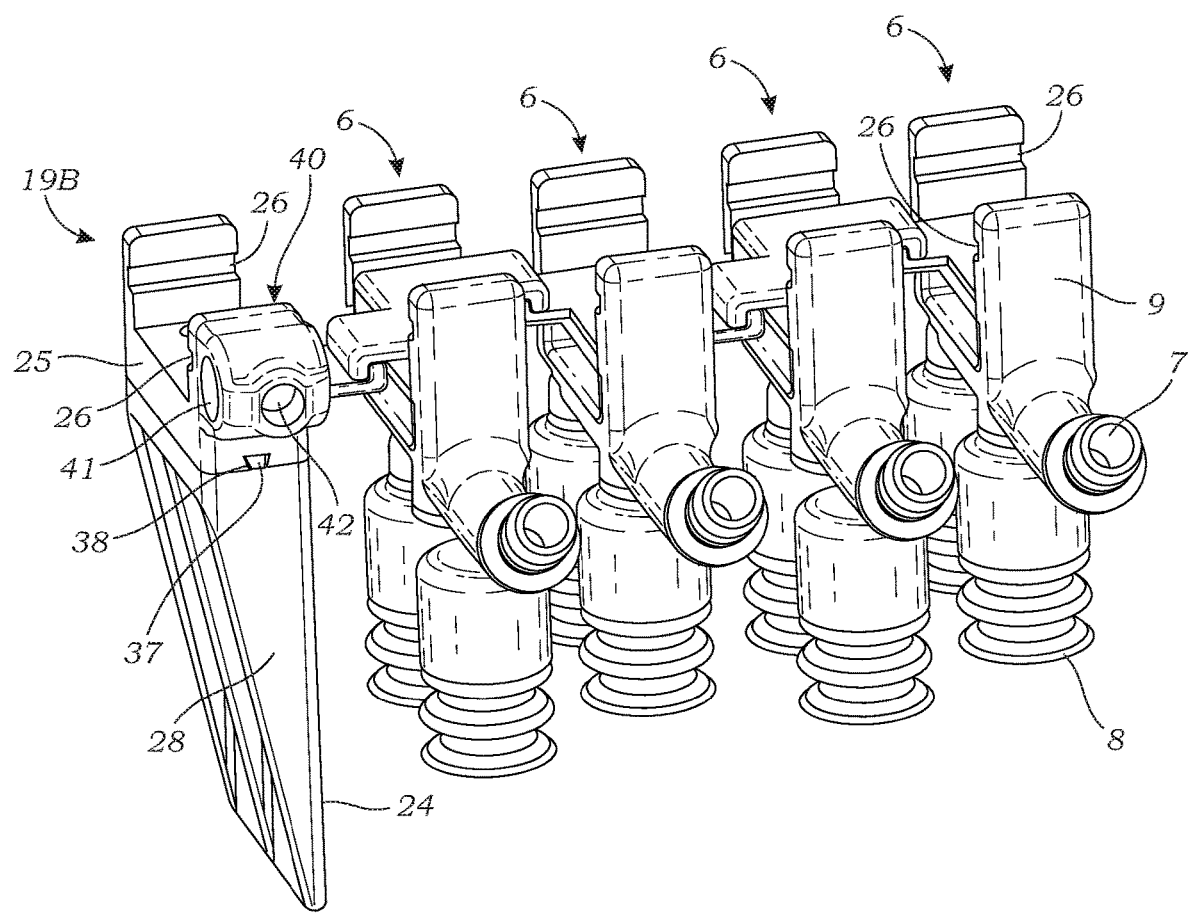
FIG. 5 is a perspective view of a compression wedge and a group of carrier assemblies shown in a diverged position (detached from the frame for illustration)

Turning now to FIG. 5, a perspective view of a back compression wedge 19B and a group of carrier assemblies 6 is shown in a diverged position, detached from the frame 10 for illustration. Again, although a back compression wedge 19B is being used for illustration, the discussion applies analogously to a front compression wedge 20F. This back compression wedge 19B is attached to a wedge block 25 configured for linear sliding movement along the frame 10, as is apparent from the grooves 26 on the wedge block 25 and from the drive rod housing 40. The drive rod housing 40 is typically an integral part of the wedge block 25, which may be 3D-printed Nylon 12, for example. The drive rod housing 40 on this back compression wedge 19B is configured to receive the left drive rod 21L through a bore 41 aligned longitudinally with the frame 10. Other back compression wedges 19B have similarly aligned bores 41, so the left drive rod 21L may pass through them all along the left side of the frame 10, as seen in FIGS. 1A, 2A, 3A, and 4A. Front compression wedges 20F have similar bores 41 aligned longitudinally with the frame 10, so the right drive rod (not shown) may pass through them all along the right side of the frame 10.

The drive rod housing 40 also has a bore 42 perpendicular to the drive rod bore 41, so the left drive rod 21L can be securely attached to the wedge block 25 with a screw such as an M4 SHCS screw. In this manner, the left drive rod 21L may be attached to all back compression wedges 19B along the left side of the frame 10. This is seen, e.g., in FIGS. 1A-4B at connection points 22-1, 22-2, and 22-3.

Figure 6:
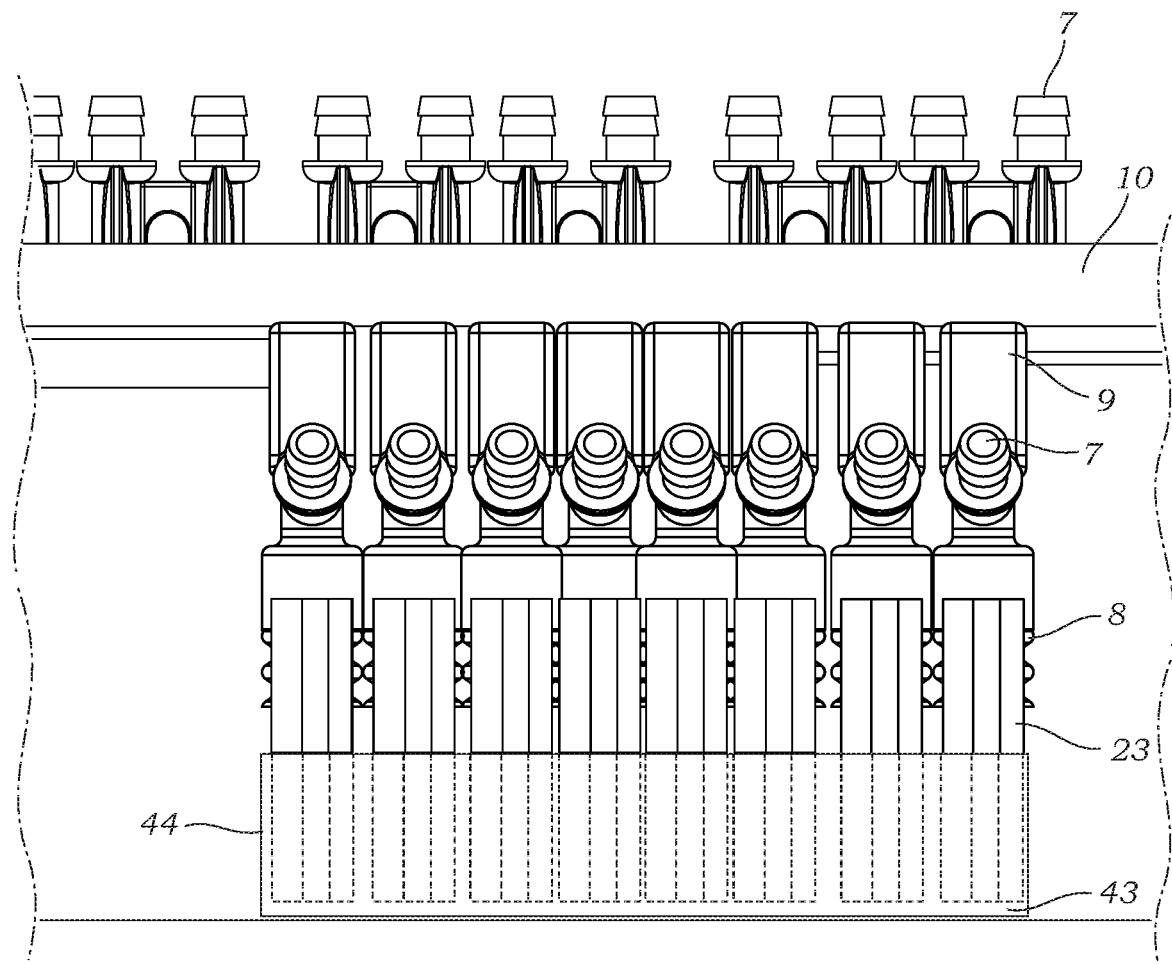
FIG. 6 is a left side elevation partial close up view of a group of bars being placed into a carton using an end effector not having compression wedges.
Figure 7:
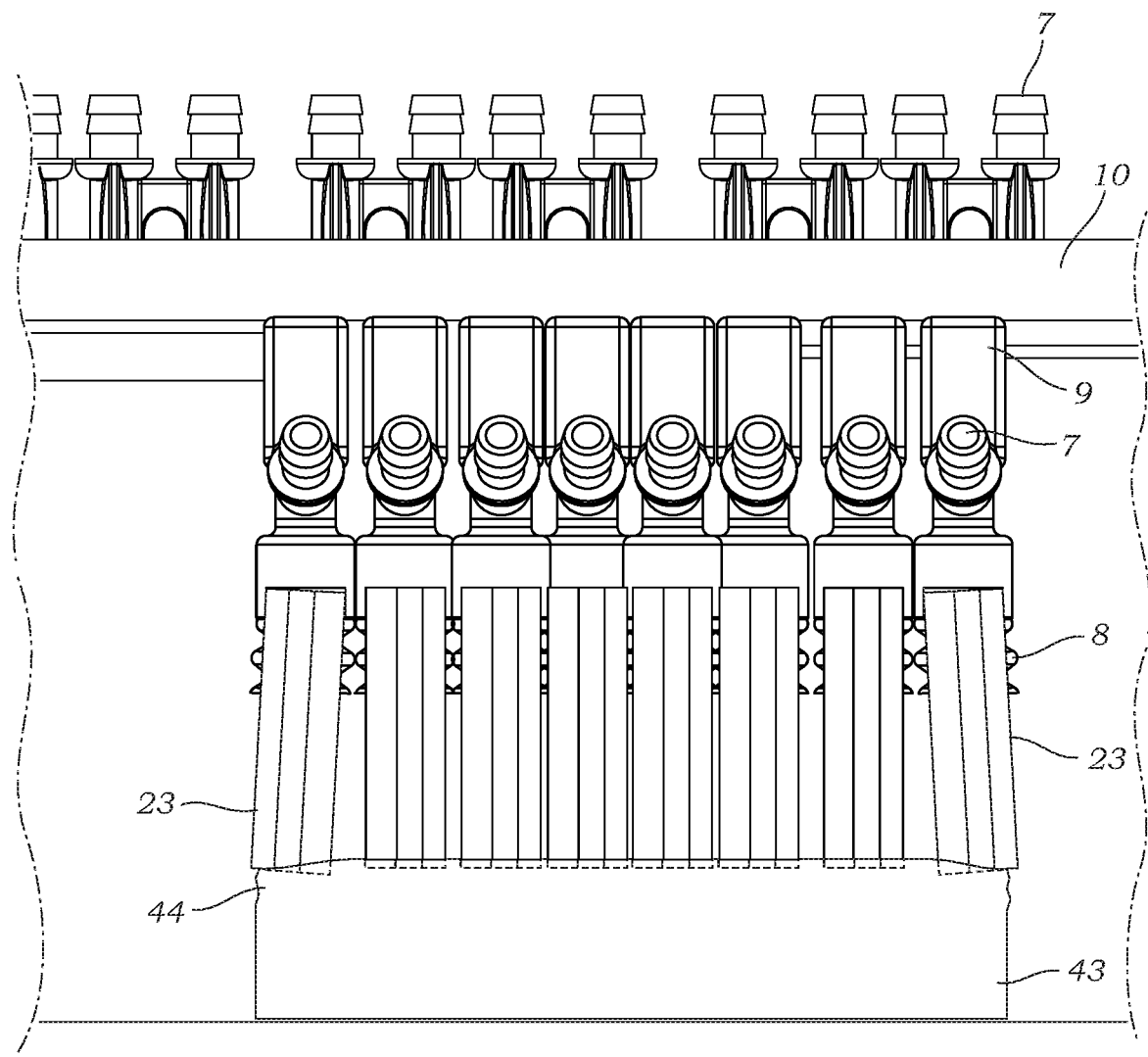
FIG. 7 is a left side elevation partial close up view of a group of bars being placed into a carton using an end effector not having compression wedges, and causing damage to the carton.

Turning now to FIGS. 6-9, the benefit of compression wedges 19B, 20F in accordance with the present invention will now be highlighted. FIG. 6 shows a left side elevation partial close up view of a group of protein bars 23 being placed into a carton 43 using an end effector 5 similar to the end effector 5 shown in FIGS. 1A-4B, but without compression wedges 19B, 20F. In FIG. 6, the bars 23 are aligned accurately and being placed into the carton 43 as designed, even without compression wedges 19B, 19F. This illustrates the desired goal, which is often achievable even without compression wedges 19B, 20F. However, without compression wedges 19B, 20F, sometimes the place operation creates bar-swing, as shown in FIG. 7. Specifically, the outside bars 23 here are flaring out due to external forces caused by the rapid movements of the end effector 5 during the place operation. As such, the outside bars 23 are not accurately aligned with the opening in the carton 43, so as they are being placed in the carton 43 they contact and push down on the carton edges 44. This can cause crunching down of the carton edges 44 as seen, resulting in minor aesthetic damage or even destruction of the carton 43 to the point the carton 43 must be discarded. In some instances the bars 23 may even be placed or fall outside of the carton 43.

Figure 8:
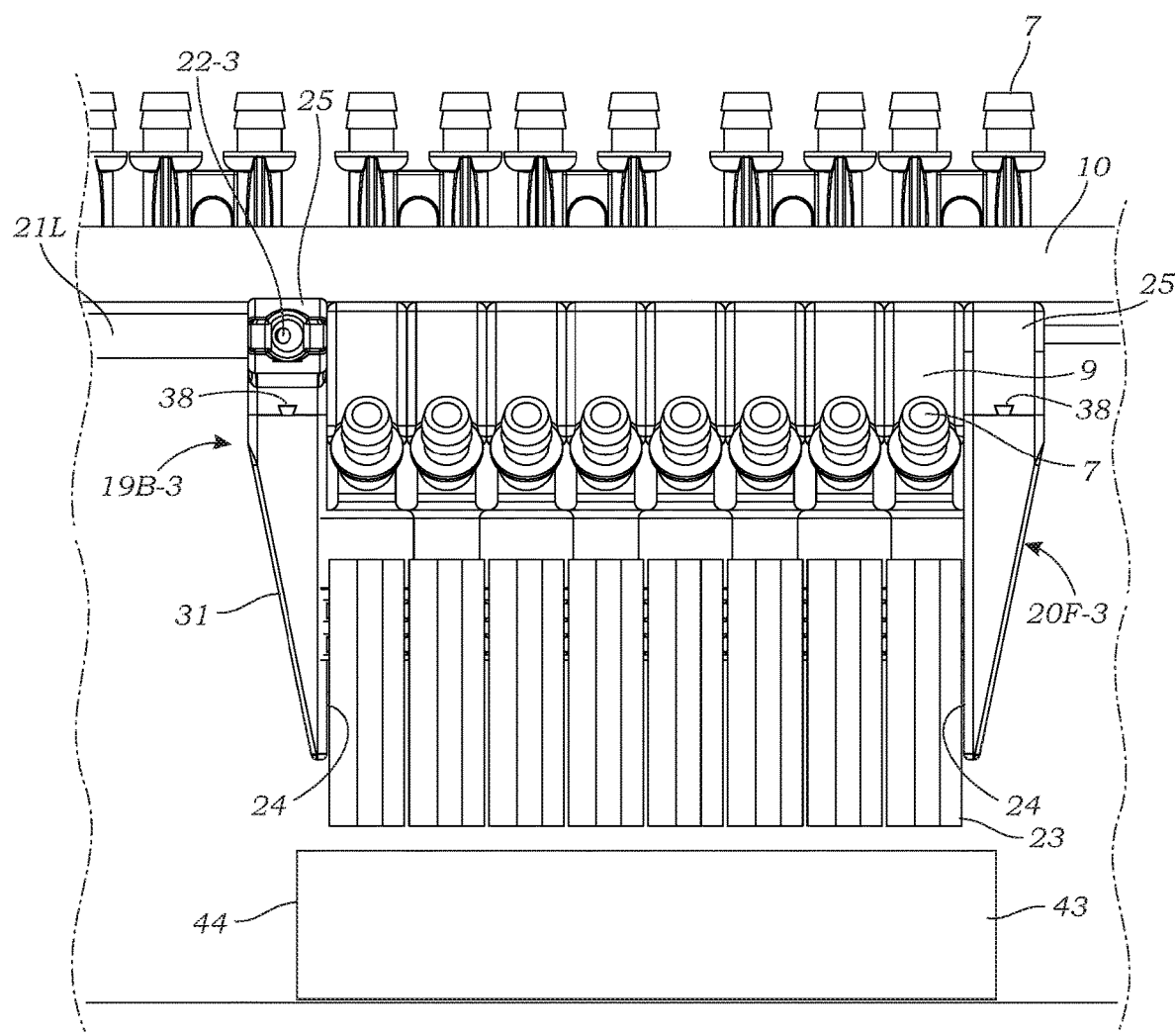
FIG. 8 is a left side elevation partial close up view of a group of bars being placed into a carton using the end effector of FIG. 1A, before the bars reach a rim of the carton.
Figure 9:
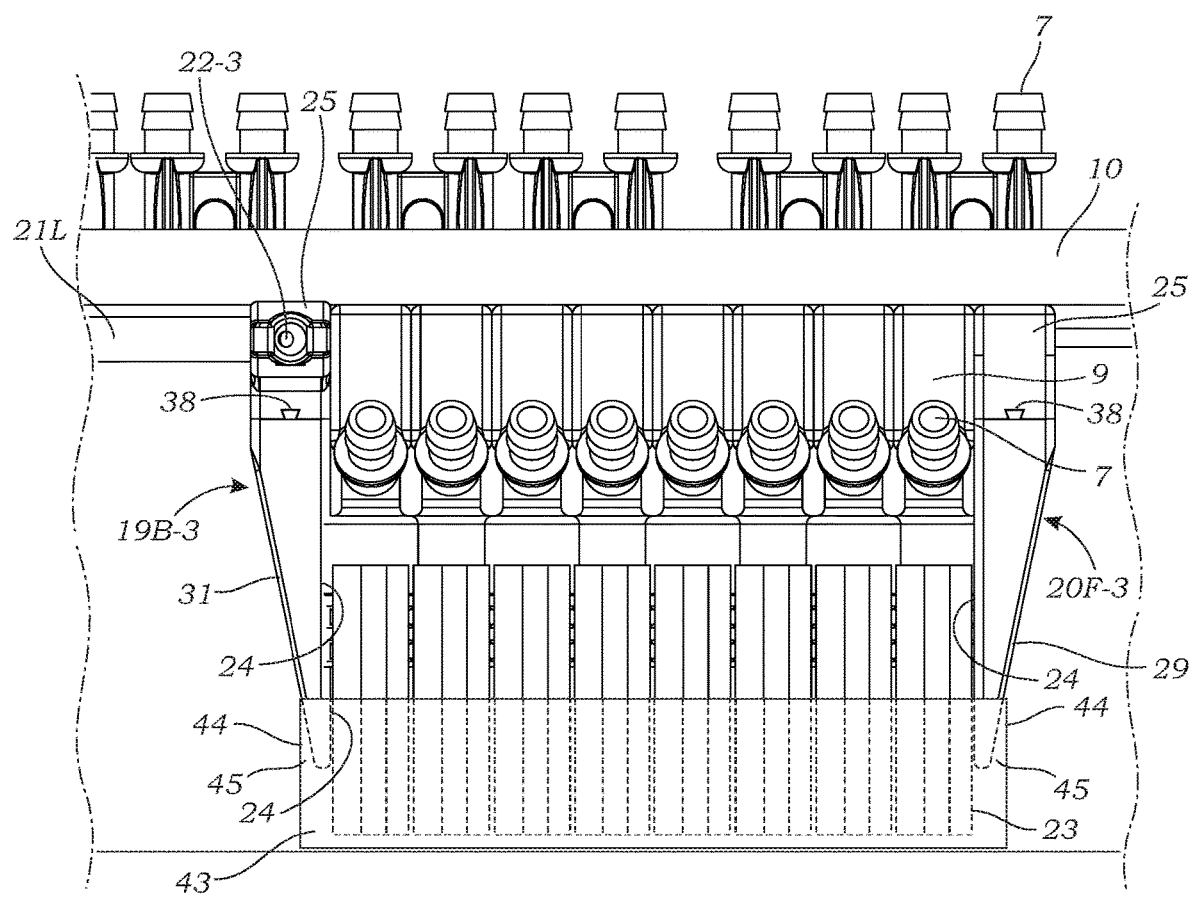
FIG. 9 is a left side elevation partial close up view of a group of bars being placed into a carton using the end effector of FIG. 1A, just prior to placement.

Turning now to FIGS. 8-9, it can be seen the difference compression wedges 19B-3 and 20E-3 make as compared to FIGS. 6-7. FIG. 8 is a left side elevation partial close up view of a group of bars 23 being carried by a group 6-3 of carrier assemblies 6, and being placed into a carton 43 using an end effector 5 in accordance with the present invention having back and front compression wedges 19B-3 and 20E-3 respectively bookending the group 6-3. As can be seen, the group 6-3 of carrier assemblies 6 is in a converged (place) position, and the bars 23 are perfectly aligned to be placed into the carton 43 similar to FIG. 6. Here, however, as compared to FIG. 6, the risk of bar-swing is minimized or even completely eliminated due to the compression wedges 19B-3 and 20E-3 squeezing the bars 23 together. The end effector 5 then completes the place operation by placing the bars 23 into the carton 43 as seen in FIG. 9, where the bars 23 fit nicely into the target carton 43 as the compression wedges 19B-3 and 20E-3 descend and the tips of the compression wedges 19F-3 and 20B-3 slightly breach the top of the carton 43. The angles 33 of the wedges 19B-3 and 20E-3 minimize any potential damage to the edges 44 of the carton 43, because as the tips of the wedges 19B-3 and 20E-3 descend there are still gaps 45 between the carton edges 44 and the back edges 31, 32, and 36 of the left, right, and middle walls 28, 29, and 35 respectively. Even if the compression wedges 19B-3 and 20E-3 descend deep enough to actually make contact with the carton edges 44, as shown in FIG. 9, such contact should not affect the integrity of the carton 43. A specific depth can be programmed as needed according to the specific application. The angles 33 also minimize any potential damage to the carton 43 after the bars 23 are released and the compression wedges 19B-3 and 20E-3 are lifted (along with the group 6-3 of carrier assemblies 6) in preparation for the next pick operation.

Although particular embodiments have been shown and described, the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. An end effector comprising:
a frame having a right side and a left side;
a rack and pinion assembly comprising a right side rack slidingly engaged with the right side of the frame and configured for linear sliding movement along the right side of the frame, a left side rack slidingly engaged with the left side of the frame and configured for linear sliding movement along the left side of the frame, and a pinion rotatably engaged between the right side rack and the left side rack;
a first group of carrier assemblies slidingly engaged with the frame and configured for linear sliding movement along the frame, arranged linearly from a first back carrier assembly to a first front carrier assembly;
a first back compression wedge securely attached to a first back wedge block that is slidingly engaged with the frame and configured for linear sliding movement along the frame, the first back compression wedge being positioned linearly before the first back carrier assembly;
a first front compression securely attached to a first front wedge block that is engaged with the frame, the first front compression wedge being positioned linearly after the first front carrier assembly; and
a left drive rod securely attached to the left side rack and the first back wedge block such that when the first group of carrier assemblies is in a first diverged position and the pinion is rotated within the right side rack and the left side rack by a rotary axis, the left drive rod moves linearly with the left side rack to drive the first back compression wedge linearly towards the first front compression wedge;
wherein the first group of carrier assemblies is configured to be compressed together into a first converged position bookended by the first back compression wedge and the first front compression wedge when the left drive rod drives the first back compression wedge linearly towards the first front compression wedge.

2. The end effector of claim 1, wherein the first back compression wedge has a dovetail along a top surface, the first back wedge block has a complimentary dovetail groove along a bottom surface, and the first back compression wedge is attached to the first back wedge block by the dovetail mating with the dovetail groove.

3. The end effector of claim 2, wherein the first back compression wedge is further attached to the first back wedge block using at least one screw passing through a hole in the top of the first back compression wedge.

4. The end effector of claim 1, wherein the first front wedge block is securely attached to the frame.

5. The end effector of claim 1, wherein the first front wedge block is slidingly engaged with the frame and configured for linear sliding movement along the frame, the end effector further comprising a right drive rod securely attached to the right side rack and the first front wedge block such that when the first group of carrier assemblies is in the first diverged position and the pinion is rotated within the right side rack and the left side rack by the rotary axis, the right drive rod moves linearly with the right side rack to drive the first front compression wedge linearly towards the first back compression wedge;

wherein the first group of carrier assemblies is configured to be compressed together into the first converged position bookended by the first back compression wedge and the first front compression wedge when the right drive rod drives the first front compression wedge linearly towards the first back compression wedge.

6. The end effector of claim 5, further comprising:
a second group of carrier assemblies slidingly engaged with the frame and configured for linear sliding movement along the frame, arranged linearly from a second back carrier assembly to a second front carrier assembly;
a second back compression wedge securely attached to a second back wedge block that is slidingly engaged with the frame and configured for linear sliding movement along the frame, the second back compression wedge being positioned linearly before the second back carrier assembly; and
a second front compression wedge securely attached to a second front wedge block that is engaged with the frame, the second front compression wedge being positioned linearly after the second front carrier assembly but before the first back compression wedge;
wherein the left drive rod is securely attached to the second back wedge block such that when the second group of carrier assemblies is in a second diverged position and the pinion is rotated within the right side rack and the left side rack by the rotary axis, the left drive rod drives the second back compression wedge linearly towards the second front compression wedge;
wherein the second group of carrier assemblies is configured to be compressed together into the second converged position bookended by the second back compression wedge and the second front compression wedge when the left drive rod drives the second back compression wedge linearly towards the second front compression wedge.

7. The end effector of claim 6, wherein the second front wedge block is securely attached to the frame.

8. The end effector of claim 6:
wherein the second front wedge block is slidingly engaged with the frame and configured for linear sliding movement along the frame;
wherein the right drive rod is securely attached to the second front wedge block such that when the second group of carrier assemblies is in the second diverged position and the pinion is rotated within the right side rack and the left side rack by the rotary axis, the right drive rod drives the second front compression wedge linearly towards the second back compression wedge; and
wherein the second group of carrier assemblies is configured to be compressed together into the second converged position bookended by the second back compression wedge and the second front compression wedge when the right drive rod drives the second front compression wedge linearly towards the second back compression wedge.

9. The end effector of claim 6, wherein the second front wedge block is slidingly engaged with the frame and configured for linear sliding movement along the frame.

10. The end effector of claim 8, further comprising:
a third group of carrier assemblies slidingly engaged with the frame and configured for linear sliding movement along the frame, arranged linearly from a third back carrier assembly to a third front carrier assembly;
a third back compression wedge securely attached to a third back wedge block that is slidingly engaged with the frame and configured for linear sliding movement along the frame, the third back compression wedge being positioned linearly before the third back carrier assembly; and
a third front compression wedge securely attached to a third front wedge block that is engaged with the frame, the third front compression wedge being positioned linearly after the third front carrier assembly but before the second back compression wedge;
wherein the left drive rod is securely attached to the third back wedge block such that when the third group of carrier assemblies is in a third diverged position and the pinion is rotated within the right side rack and the left side rack by the rotary axis, the left drive rod drives the third back compression wedge linearly towards the third front compression wedge;
wherein the third group of carrier assemblies is configured to be compressed together into a third converged position bookended by the third back compression wedge and the third front compression wedge when the left drive rod drives the third back compression wedge linearly towards the third front compression wedge.

11. The end effector of claim 10, wherein the third front wedge block is slidingly engaged with the frame and configured for linear sliding movement along the frame.

12. The end effector of claim 10, wherein the third front wedge block is securely attached to the frame.

13. The end effector of claim 10:
wherein the third front wedge block is slidingly engaged with the frame and configured for linear sliding movement along the frame;
wherein the right drive rod is securely attached to the third front wedge block such that when the third group of carrier assemblies is in the third diverged position and the pinion is rotated within the right side rack and the left side rack by the rotary axis, the right drive rod drives the third front compression wedge linearly towards the third back compression wedge; and
wherein the third group of carrier assemblies is configured to be compressed together into the third converged position bookended by the third back compression wedge and the third front compression wedge when the right drive rod drives the third front compression wedge linearly towards the third back compression wedge.

14. The end effector of claim 1, wherein the first front wedge block is slidingly engaged with the frame and configured for linear sliding movement along the frame.

15. A compression wedge for use with an end effector having a frame, a rack and pinion assembly, a drive rod configured for linear sliding movement along the frame and fixed attachment to a wedge block configured to support the compression wedge and for linear sliding movement along the frame, and a first group of carrier assemblies slidingly engaged with the frame and configured for linear sliding movement along the frame and arranged linearly from a first back carrier assembly to a first front carrier assembly, the wedge block positioned linearly before the first back carrier assembly and configured for linear sliding movement along the frame, the compression wedge comprising:

a front wall having a front surface configured to contact the first back carrier assembly to slide the first back carrier assembly linearly along the frame when the wedge block is slid linearly along the frame by the drive rod;

a left wall extending back at a right angle from the front wall, a back edge of the left wall forming an acute angle with the front wall;

a right wall extending back at a right angle from the front wall, a back edge of the right wall being parallel to the back edge of the left wall;

a top connecting the front wall to the left wall and to the right wall, configured for secured attachment to the wedge block; and a middle wall extending back at a right angle from the front wall between the right wall and the left wall, a back edge of the middle wall being parallel to the back edges of the left wall and the right wall.

16. A compression wedge for use with an end effector having a frame, a rack and pinion assembly, a drive rod configured for linear sliding movement along the frame and fixed attachment to a wedge block configured to support the compression wedge and for linear sliding movement along the frame, and a first group of carrier assemblies slidingly engaged with the frame and configured for linear sliding movement along the frame and arranged linearly from a first back carrier assembly to a first front carrier assembly, the wedge block positioned linearly before the first back carrier assembly and configured for linear sliding movement along the frame, the compression wedge comprising:

a front wall having a substantially flat front surface configured to contact the first back carrier assembly to slide the first back carrier assembly linearly along the frame when the wedge block is slid linearly along the frame by the drive rod;

a left wall extending back at a right angle from the front wall, a back edge of the left wall forming an acute angle with the front wall;

a right wall extending back at a right angle from the front wall, a back edge of the right wall being parallel to the back edge of the left wall; and a top connecting the front wall to the left wall and to the right wall, configured for secured attachment to the wedge block.

17. The compression wedge of claim 16, wherein the acute angle is between about 5 degrees and about 15 degrees.

18. A compression wedge for use with an end effector having a frame, a rack and pinion assembly, a drive rod configured for linear sliding movement along the frame and fixed attachment to a wedge block configured to support the compression wedge and for linear sliding movement along the frame, and a first group of carrier assemblies slidingly engaged with the frame and configured for linear sliding movement along the frame and arranged linearly from a first back carrier assembly to a first front carrier assembly, the wedge block positioned linearly before the first back carrier assembly and configured for linear sliding movement along the frame, the compression wedge comprising:

a front wall having a front surface configured to contact the first back carrier assembly to slide the first back carrier assembly linearly along the frame when the wedge block is slid linearly along the frame by the drive rod;

a left wall extending back at a right angle from the front wall, a back edge of the left wall forming an angle between about 5 degrees and about 15 degrees with the front wall;

a right wall extending back at a right angle from the front wall, a back edge of the right wall being parallel to the back edge of the left wall; and a top connecting the front wall to the left wall and to the right wall, configured for secured attachment to the wedge block.

19. A compression wedge for use with an end effector having a frame, a rack and pinion assembly, a drive rod configured for linear sliding movement along the frame and fixed attachment to a wedge block configured to support the compression wedge and for linear sliding movement along the frame, and a first group of carrier assemblies slidingly engaged with the frame and configured for linear sliding movement along the frame and arranged linearly from a first back carrier assembly to a first front carrier assembly, the wedge block positioned linearly before the first back carrier assembly and configured for linear sliding movement along the frame, the compression wedge comprising:

a front wall having a front surface configured to contact the first back carrier assembly to slide the first back carrier assembly linearly along the frame when the wedge block is slid linearly along the frame by the drive rod;

a left wall extending back at a right angle from the front wall, a back edge of the left wall forming an acute angle with the front wall;

a right wall extending back at a right angle from the front wall, a back edge of the right wall being parallel to the back edge of the left wall; and a top connecting the front wall to the left wall and to the right wall, configured for secured attachment to the wedge block;

wherein the compression wedge has a dovetail on a top surface of the top, configured to mate with a complimentary dovetail groove along a bottom surface of the wedge block.

20. The compression wedge of claim 19, wherein the compression wedge has at least one hole in the top, positioned for alignment with a corresponding at least one hole in a bottom surface of the wedge block, and configured so the compression wedge may be securely attached to the wedge block by at least one corresponding screw.

* * * * *